(12) United States Patent  
Porter

(10) Patent No.: US 9,339,093 B1
(45) Date of Patent: May 17, 2016

(54) SHOVEL WITH AN ATTACHABLE UMBRELLA

(71) Applicant: Nathaniel Porter, Santa Fe, NM (US)

(72) Inventor: Nathaniel Porter, Santa Fe, NM (US)

( * ) Notice: Subject to any disclaimer, the term of this patent is extended or adjusted under 35 U.S.C. 154(b) by 0 days.

(21) Appl. No.: 14/822,449

(22) Filed: Aug. 10, 2015

(51) Int. Cl.
*A45B 23/00* (2006.01)
*A45B 19/00* (2006.01)
*A45B 25/00* (2006.01)
*A01B 1/02* (2006.01)

(52) U.S. Cl.
CPC ............... *A45B 23/00* (2013.01); *A01B 1/022* (2013.01); *A45B 2019/002* (2013.01); *A45B 2023/0012* (2013.01); *A45B 2025/003* (2013.01); *A45B 2200/1009* (2013.01)

(58) Field of Classification Search
CPC ............... A45B 2023/0006; A45B 2023/0012; A45B 2025/003; A45B 2200/1009; A45B 2019/002
USPC .................................. 135/25.41, 34.2, 17, 19
See application file for complete search history.

(56) References Cited

U.S. PATENT DOCUMENTS

| | | | | | |
|---|---|---|---|---|---|
| 2,266,684 | A | * | 12/1941 | Brown | A45B 15/00 135/16 |
| 2,736,329 | A | * | 2/1956 | Cornellier | A45B 19/02 135/20.2 |
| 5,271,196 | A | * | 12/1993 | Fanti | E04H 12/2246 135/16 |
| 5,293,889 | A | * | 3/1994 | Hall | A45B 3/00 135/16 |
| 5,482,071 | A | * | 1/1996 | Liu | A45B 3/00 135/66 |
| D371,901 | S | * | 7/1996 | Perls | D3/5 |
| 5,743,580 | A | * | 4/1998 | Evans | B25G 3/30 294/51 |
| 6,036,161 | A | * | 3/2000 | O'Shea | A01K 97/10 248/518 |
| 6,073,642 | A | * | 6/2000 | Huang | A45B 9/00 135/114 |
| 6,334,454 | B1 | * | 1/2002 | Williams | A45B 25/24 135/18 |
| 6,354,554 | B1 | * | 3/2002 | Hollenbeck | E04H 12/2246 248/156 |
| 6,487,977 | B1 | * | 12/2002 | Williams | A45B 23/00 108/150 |
| 7,191,996 | B2 | * | 3/2007 | Patsalaridis | E04H 12/2223 135/16 |
| 7,406,975 | B1 | | 8/2008 | Carrier, Jr. | |
| 7,950,085 | B2 | | 5/2011 | McGovern | |
| D652,615 | S | * | 1/2012 | Paolucci | D3/5 |
| 8,387,188 | B2 | | 3/2013 | Murphy | |
| 2007/0204891 | A1 | * | 9/2007 | Zubyk | E04H 12/2261 135/16 |
| 2012/0042915 | A1 | * | 2/2012 | Dorr | E04H 12/2215 135/16 |
| 2013/0037066 | A1 | * | 2/2013 | Dorr | E04H 12/2215 135/16 |
| 2014/0230866 | A1 | * | 8/2014 | Paolucci | E04H 12/2215 135/15.1 |

FOREIGN PATENT DOCUMENTS

AU   WO 9748303 A1 * 12/1997 ............. A45B 19/00
CN     204244648 U * 4/2015

OTHER PUBLICATIONS

English translation of CN 204244648 U from espacenet.com.*

* cited by examiner

*Primary Examiner* — David R Dunn
*Assistant Examiner* — Danielle Jackson
(74) *Attorney, Agent, or Firm* — Crossley & Stevenson IP Law

(57) ABSTRACT

A shovel with an attachable umbrella including a shovel having a blade attached to a cylindrical handle, an aperture continuously disposed within the handle of the shovel from a threaded top end to proximal a bottom end, an umbrella, and a cap removably attached to the umbrella. The umbrella has a shaft, a canopy, and a hollow cylindrical base. The top end of the handle selectively threadably engages an interior surface of the base proximal a top surface of the base. The top end of the handle selectively threadably engages the interior surface of the base proximal the bottom surface of the base.

6 Claims, 3 Drawing Sheets

SHOVEL WITH AN ATTACHABLE UMBRELLA

BACKGROUND OF THE INVENTION

Various types of shovels are known in the prior art. However, what has been needed is a shovel with an attachable umbrella including a shovel having a blade attached to a cylindrical handle, an aperture continuously disposed within the handle of the shovel from a threaded top end to proximal a bottom end, and an umbrella. What has been further needed is for the umbrella to have a shaft, a canopy, and a hollow cylindrical base having a top surface, a bottom surface, an exterior surface, a threaded interior surface, and a solid middle portion disposed within the base. Lastly, what has been needed is for the top end of the handle to selectively threadably engage an interior surface of the base proximal a top surface of the base, and for the top end of the handle to also selectively threadably engage the interior surface of the base proximal the bottom surface of the base. The shovel with an attachable umbrella thus provides a user with protection against the elements while working outdoors and eliminates the need for the user to separately carry both items.

FIELD OF THE INVENTION

The present invention relates to shovels, and more particularly, to a shovel with an attachable umbrella.

SUMMARY OF THE INVENTION

The general purpose of the present shovel with an attachable umbrella, described subsequently in greater detail, is to provide a shovel which has many novel features that result in a shovel with an attachable umbrella which is not anticipated, rendered obvious, suggested, or even implied by prior art, either alone or in combination thereof.

To accomplish this, the present shovel with an attachable umbrella includes a shovel, an aperture, an umbrella, and a cap. The shovel has a blade attached to a cylindrical handle. The blade of the shovel has a top edge and a bottom edge, and the handle of the shovel has a bottom end and a threaded top end. The handle of the shovel is optionally fiberglass. The aperture is continuously disposed within the handle of the shovel from the threaded top end to proximal the bottom end. The umbrella has a shaft, a canopy attached to a top area of the shaft, and a hollow cylindrical base. The base of the umbrella has a top surface, a bottom surface, an exterior surface, a threaded interior surface, and a solid middle portion medially disposed within the base. A bottom area of the shaft of the umbrella is disposed within the middle portion of the base, and the shaft of the umbrella is extended through the top surface of the base. A circumference of the base of the umbrella substantially conforms to a circumference of the handle of the shovel.

The top end of the handle selectively threadably engages the interior surface of the base proximal the top surface. The top end of the handle also selectively threadably engages the interior surface of the base proximal the bottom surface. The shaft of the umbrella and the canopy of the umbrella are fully disposed within the handle of the shovel when the top end of the handle is threadably engaged with the interior surface of the base proximal the top surface. The shaft of the umbrella and the canopy of the umbrella are disposed atop the handle of the shovel when the top end of the handle is threadably engaged with the interior surface of the base proximal the bottom surface. The cap is removably attached to the bottom surface of the base. The cap is optionally rubberized.

The shovel with an attachable umbrella optionally includes a kickstand and a cord. The kickstand has a support arm pivotally attached to the blade of the shovel proximal the top edge of the blade. The kickstand is rotatable to an upward position and an alternate downward position. The kickstand is in the upward position when the kickstand is disposed parallel and adjacent to the handle of the shovel. The kickstand is in the downward position when a tip of the kickstand is substantially collinearly disposed with the bottom edge of the blade. The optional kickstand maintains the shovel and the umbrella in an upright position so that a user can remain protected from the elements while continuing to work outdoors. The cord has a right end and a left end. The right end of the cord is medially attached to an external surface of the cap, and the left end of the cord is medially attached to the exterior surface of the base of the umbrella.

Thus has been broadly outlined the more important features of the present shovel with an attachable umbrella so that the detailed description thereof that follows may be better understood and in order that the present contribution to the art may be better appreciated.

BRIEF DESCRIPTION OF THE DRAWINGS

Figures

DETAILED DESCRIPTION OF THE DRAWINGS

Figure 1:
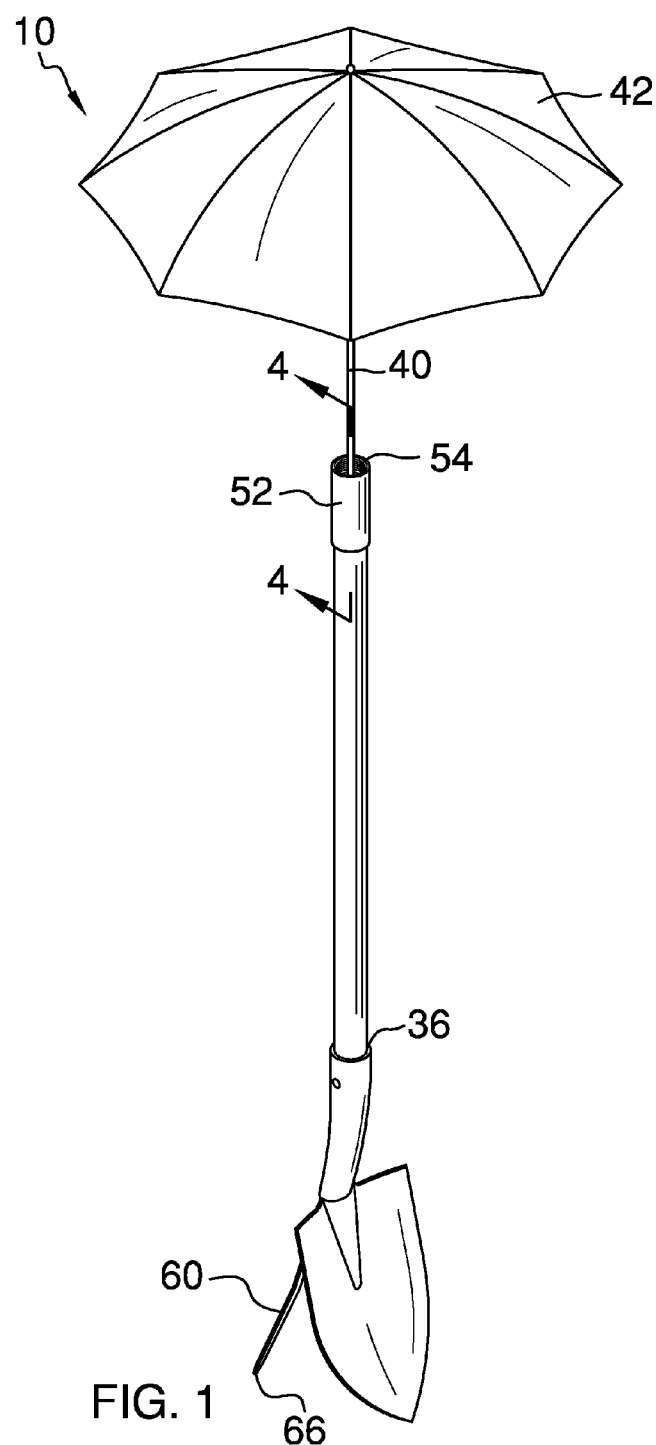
FIG. 1 is a front isometric view showing a kickstand in a downward position.
Figure 2:
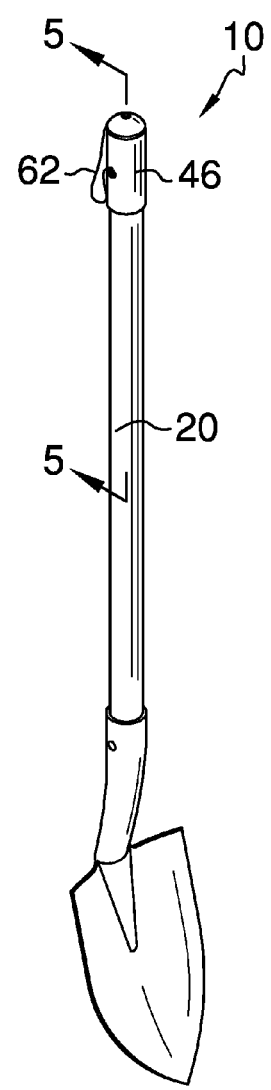
FIG. 2 is a front isometric view showing an umbrella disposed within a handle of a shovel.

With reference now to the drawings, and in particular FIGS. 1 through 5 thereof, an example of the instant shovel with an attachable umbrella employing the principles and concepts of the present shovel with an attachable umbrella and generally designated by the reference number 10 will be described.

Referring to FIGS. 1 through 5 the present shovel with an attachable umbrella 10 is illustrated. The shovel with an attachable umbrella 10 includes a shovel 20, an aperture 22, an umbrella 24, and a cap 26. The shovel 20 has a blade 28 attached to a cylindrical handle 30. The blade 28 of the shovel 20 has a top edge 32 and a bottom edge 34, and the handle 30 of the shovel 20 has a bottom end 36 and a threaded top end 38. The aperture 22 is continuously disposed within the handle 30 of the shovel 20 from the threaded top end 38 to proximal the bottom end 36. The umbrella 24 has a shaft 40, a canopy 42 attached to a top area 44 of the shaft 40, and a hollow cylindrical base 46. The base 46 of the umbrella 24 has a top surface 48, a bottom surface 50, an exterior surface 52, a threaded interior surface 54, and a solid middle portion 56 medially disposed within the base 46. A bottom area 58 of the shaft 40 of the umbrella 24 is disposed within the middle portion 56 of the base 46, and the shaft 40 of the umbrella 24 is extended through the top surface 48 of the base 46.

Figure 5:
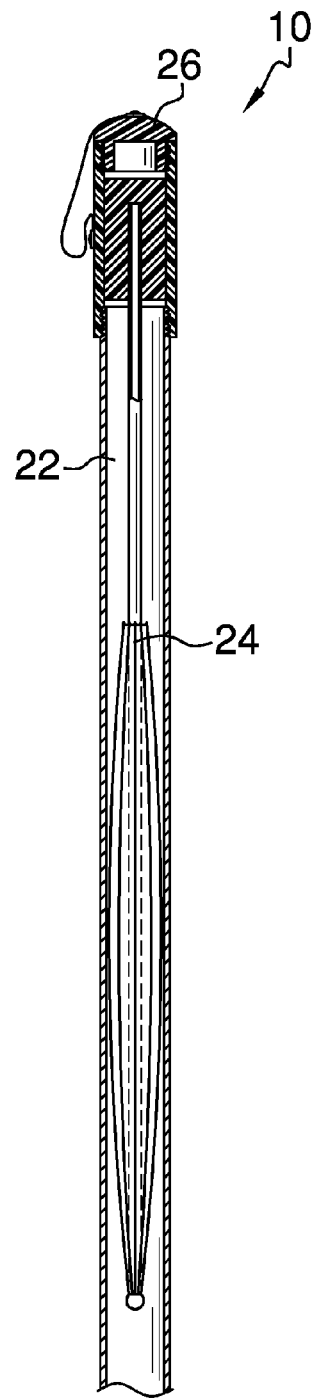
FIG. 5 is a cross-sectional view taken along line 5-5 of FIG. 2.

The top end 38 of the handle 30 selectively threadably engages the interior surface 54 of the base 46 proximal the top surface 48. The top end 38 of the handle 30 also selectively threadably engages the interior surface 54 of the base 46 proximal the bottom surface 50. As best shown in FIG. 5, the shaft 40 of the umbrella 24 and the canopy 42 of the umbrella 24 are fully disposed within the handle 30 of the shovel 20 when the top end 38 of the handle 30 is threadably engaged with the interior surface 54 of the base 46 proximal the top surface 48. As best shown in FIG. 1, the shaft 40 of the umbrella 24 and the canopy 42 of the umbrella 24 are disposed atop the handle 30 of the shovel 20 when the top end 38 of the handle 30 is threadably engaged with the interior surface 54 of the base 46 proximal the bottom surface 50. The cap 26 is removably attached to the bottom surface 50 of the base 46.

Figure 3:
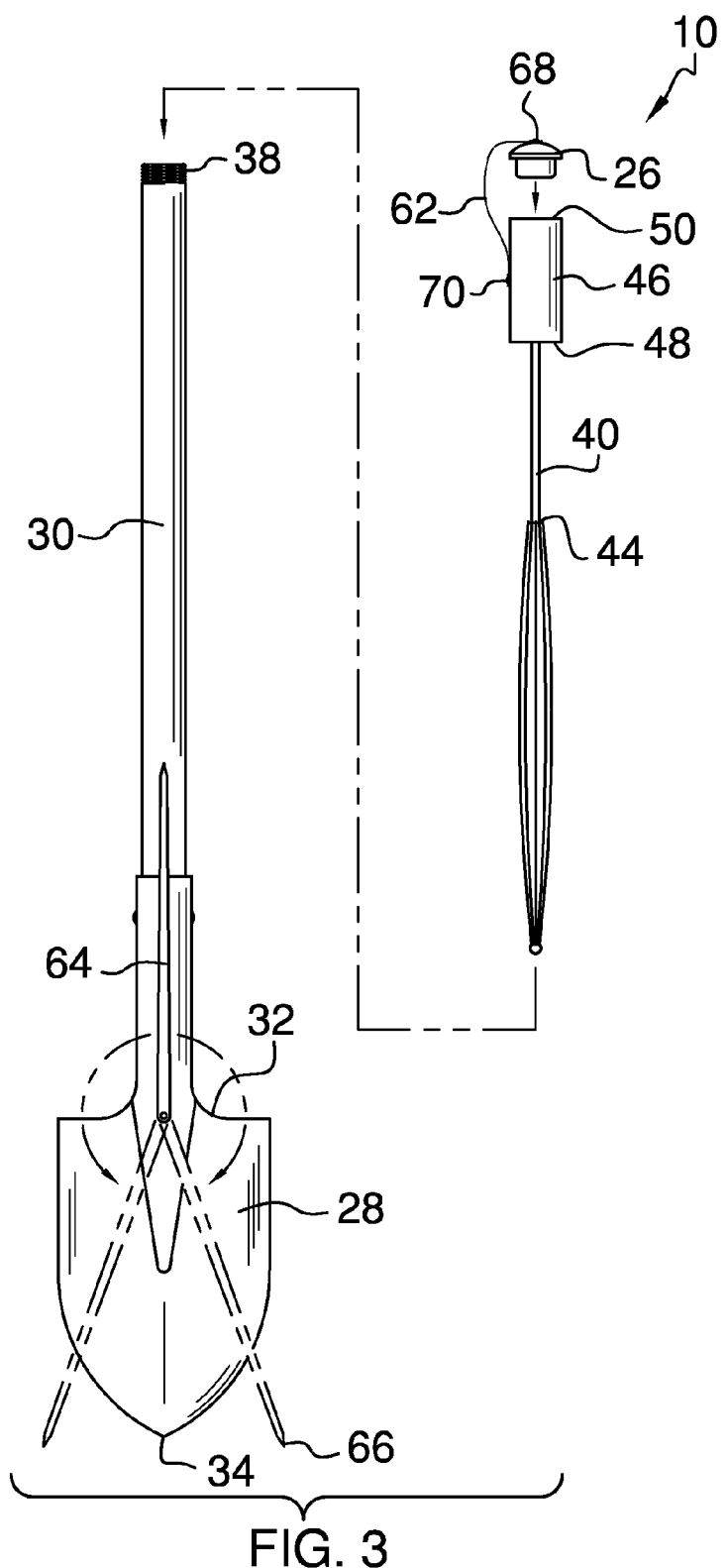
FIG. 3 is a rear elevation view.
Figure 4:
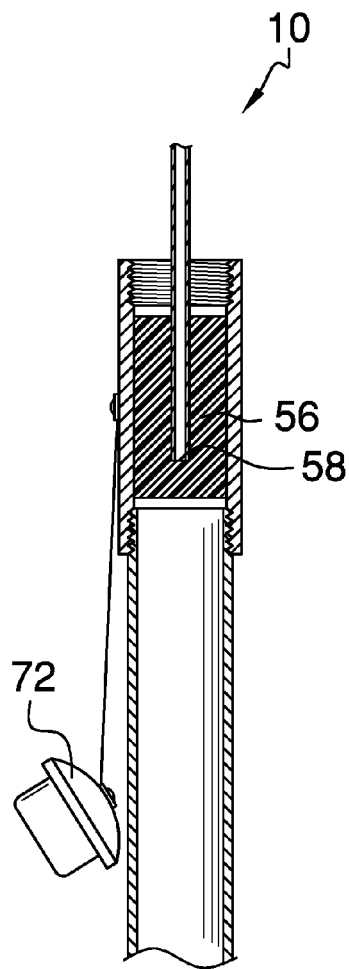
FIG. 4 is cross-sectional view taken along line 4-4 of FIG. 1.

The shovel with an attachable umbrella 10 optionally includes a kickstand 60 and a cord 62. The kickstand 60 has a support arm 64 pivotally attached to the blade 28 of the shovel 20 proximal the top edge 32 of the blade 28. As best shown in FIG. 3, the kickstand 60 is rotatable to an upward position and an alternate downward position. The kickstand 60 is in the upward position when the kickstand 60 is disposed parallel and adjacent to the handle 30 of the shovel 20. The kickstand 60 is in the downward position when a tip 66 of the kickstand 60 is substantially collinearly disposed with the bottom edge 34 of the blade 28. The cord 62 has a right end 68 and a left end 70. The right end 68 of the cord 62 is medially attached to an external surface 72 of the cap 26, and the left end 70 of the cord 62 is medially attached to the exterior surface 52 of the base 46 of the umbrella 24.

What is claimed is:

1. A shovel with an attachable umbrella comprising:
   a shovel having a blade attached to a cylindrical handle, wherein the blade has a top edge and a bottom edge, and the handle has a bottom end and a threaded top end;
   an aperture continuously disposed within the shovel handle from the threaded top end to proximal the bottom end;
   an umbrella having a shaft, a canopy attached to a top area of the shaft, and a hollow cylindrical base having a top surface, a bottom surface, an exterior surface, a threaded interior surface, and a solid middle portion medially disposed within the base, wherein a bottom area of the shaft is disposed within the middle portion of the base, and the shaft is extended through the base top surface;
   wherein a circumference of the umbrella base substantially conforms to a circumference of the shovel handle;
   wherein the handle top end selectively threadably engages the base interior surface proximal the top surface;
   wherein the handle top end selectively threadably engages the base interior surface proximal the bottom surface;
   wherein the umbrella shaft and the umbrella canopy are fully disposed within the shovel handle when the handle top end is threadably engaged with the base interior surface proximal the top surface;
   wherein the umbrella shaft and the umbrella canopy are disposed atop the shovel handle when the handle top end is threadably engaged with the base interior surface proximal the bottom surface; and
   a cap removably attached to the base bottom surface.

2. The shovel with an attachable umbrella of claim 1 further comprising:
   a kickstand having a support arm pivotally attached to the shovel blade proximal the blade top edge;
   wherein the kickstand is rotatable to an upward position and an alternate downward position;
   wherein the kickstand is in the upward position when the kickstand is disposed parallel and adjacent to the shovel handle;
   wherein the kickstand is in the downward position when a tip of the kickstand is substantially collinearly disposed with the blade bottom edge.

3. The shovel with an attachable umbrella of claim 1 further comprising a cord having a right end and a left end, wherein the cord right end is medially attached to an external surface of the cap, and the cord left end is medially attached to the exterior surface of the umbrella base.

4. The shovel with an attachable umbrella of claim 1 wherein the shovel handle is fiberglass.

5. The shovel with an attachable umbrella of claim 1 wherein the cap is rubberized.

6. A shovel with an attachable umbrella comprising:
   a shovel having a blade attached to a cylindrical handle, wherein the blade has a top edge and a bottom edge, and the handle has a bottom end and a threaded top end;
   wherein the shovel handle is fiberglass;
   an aperture continuously disposed within the shovel handle from the threaded top end to proximal the bottom end;
   an umbrella having a shaft, a canopy attached to a top area of the shaft, and a hollow cylindrical base having a top surface, a bottom surface, an exterior surface, a threaded interior surface, and a solid middle portion medially disposed within the base, wherein a bottom area of the shaft is disposed within the middle portion of the base, and the shaft is extended through the base top surface;
   wherein a circumference of the umbrella base substantially conforms to a circumference of the shovel handle;
   wherein the handle top end selectively threadably engages the base interior surface proximal the top surface;
   wherein the handle top end selectively threadably engages the base interior surface proximal the bottom surface;
   wherein the umbrella shaft and the umbrella canopy are fully disposed within the shovel handle when the handle top end is threadably engaged with the base interior surface proximal the top surface;
   wherein the umbrella shaft and the umbrella canopy are disposed atop the shovel handle when the handle top end is threadably engaged with the base interior surface proximal the bottom surface;
   a rubberized cap removably attached to the base bottom surface;
   a kickstand having a support arm pivotally attached to the shovel blade proximal the blade top edge;
   wherein the kickstand is rotatable to an upward position and an alternate downward position;
   wherein the kickstand is in the upward position when the kickstand is disposed parallel and adjacent to the shovel handle;
   wherein the kickstand is in the downward position when a tip of the kickstand is substantially collinearly disposed with the blade bottom edge; and
   a cord having a right end and a left end, wherein the cord right end is medially attached to an external surface of the cap, and the cord left end is medially attached to the exterior surface of the umbrella base.

* * * * *